May 15, 1923.
P. MARCHETTI
1,454,974
ELASTIC WHEEL
Filed Aug. 25, 1919
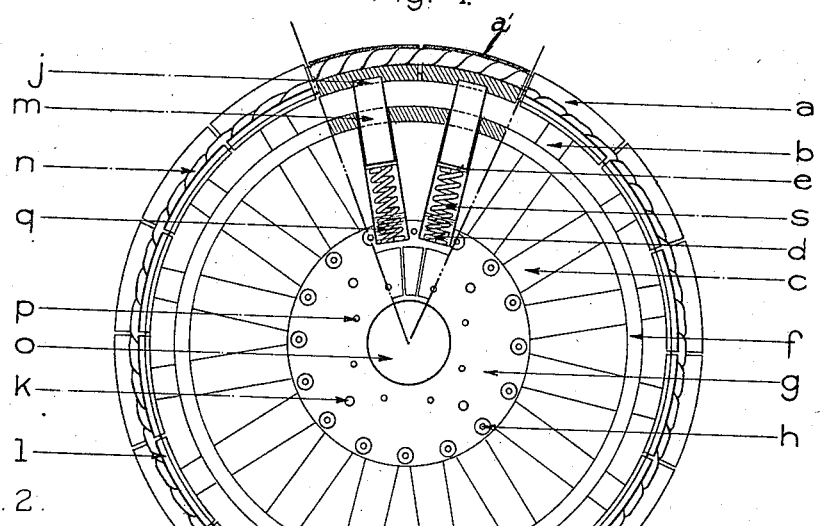
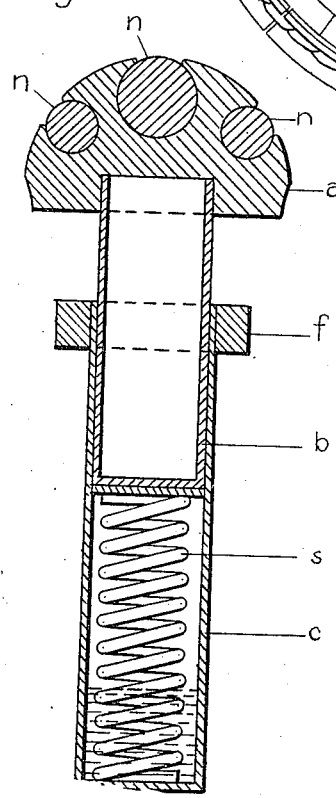
Inventor
Pericles Marchetti Patented May 15, 1923.

1,454,974

UNITED STATES PATENT OFFICE.

PERICLES MARCHETTI, OF GODOY, SANTA FE, ARGENTINA, ASSIGNOR TO SINDICATO ARGENTINO PARA LA EXPLOTACION DE INVENTOS, OF BUENOS AIRES, ARGENTINE REPUBLIC.

ELASTIC WHEEL.

Application filed August 25, 1919. Serial No. 319,709.

*To all whom it may concern:*

Be it known that I, PERICLES MARCHETTI, subject of Italy, and resident of Godoy, Province of Santa Fe, Argentine Republic, have invented certain new and useful Improvements in an Elastic Wheel, of which the following is a specification.

This invention refers to improvements in wheels for vehicles and especially for automobiles, consisting of an elastic wheel with sectional solid tires, making unnecessary the use of pneumatic tires.

The invention has for its object a wheel which can be assembled without the use of screws, and which as a whole will have the necessary elasticity to substitute advantageously for all other vehicle wheels hitherto used, whether pneumatic or otherwise, having regard not only to conditions of elasticity, but also of durability and economy.

In the accompanying drawings a form of wheel embodying my invention is illustrated.

In said drawings:—

Fig. 1 is a general view of the wheel in side elevation, partially in section;

Fig. 2 is a transverse section drawn to augmented scale, of one of the spokes with its component parts of plunger, cylinder and spiral spring, and a section of tire, omitting the covering or supplementary tire.

The details of construction are as follows: In Fig. 1, $a$ is a tire section; $b$ the plunger forming part of the spoke; $c$ the cylinder also forming part of the spoke; $d$ the lubricant inside of the cylinder $c$; $e$ is a rubber gasket or ring inside of the cylinder placed on the spiral spring $s$; forming a sort of packing; $f$ is a rim to hold the spokes in position; $g$ represents the hub discs of the wheel; $h$ are the screws holding together the two hub discs; $j$ the seating for the spoke in each tire section; $k$ the extra screws uniting the two parts of the hub, only necessary in large wheels; $l$ the side grooves in the tire sections, usually alike on both sides of the latter and designed to hold the cables or chains ($n$) which hold the parts of the wheel together in order to form a complete and flexible unit of the assembled parts; $m$ the openings through the rim $f$ which holds the spokes in position; $n$ the cables or chains or the like, of flexible metal, for uniting the combination of parts; $o$ the central opening in the wheel hub for admitting the axle of the vehicle on which the wheel is to be used; $p$ the screws for uniting the hub disks $g$ to the hub of the wheel; $q$ the seating in the centre for the plunger (or the cylinder) of the spokes; and $s$ the spiral spring forming part of the spoke. The hub is indicated diagrammatically in Fig. 1 of the drawings, and may be of any suitable construction, and forms no part of my present improvement.

When the coach bears upon the wheels, the elastic parts of the wheel begin to operate; thus if we suppose it to be resting upon the tire section $a$, (Fig. 1), the weight of the coach will cause the plunger in the spoke corresponding to said section to slide inwardly through the opening of the sustaining ring, compressing the spiral spring within the spoke cylinder, and thus successively on each section of the tire as the wheel changes position, the operation executed is simply the absorption of the shock produced by each obstacle passed over by the wheel, in a proportion equal to the extent of the spiral spring.

The assembling of the component parts of the wheel without the use of screws is effected by the use of the cables or chains or the like which are indicated by the letter $n$, (Fig. 1), thus giving to the wheel an unusual solidity, security and simplicity of assembling and dismounting, facilitating greatly the repairs which may become necessary to make in any of the component parts. In practice the cables are threaded in the grooves of the tire sections and the ends of the cables are connected together by suitable means, such as the turn buckles usually employed for this purpose, the said turn buckles or other connecting means being housed in one of the tire blocks which is provided with recesses of suitable size for this purpose.

The spokes may be of any suitable number according to the size of the wheel and the degree of elasticity desired.

Each spoke is held in its seating in the corresponding tire section by pressure alone, its union with the wheel hub being effected in the same manner. The holding of the spokes in place in the wheel is effected by the rim indicated by the letter $f$ (Fig. 1).

As here shown, each tire section is provided with three grooves in which the cables *n* are fitted, but any suitable number of grooves and cables may be employed within the scope of my invention.

For city use on stone, wood or macadam pavements, or the like, there may be placed on the tread and secured by suitable fastening means, a covering or supplementary tire of sole leather, rubber or other adequate material as indicated at *a'* of Fig. 1, susceptible of being replaced when worn and serving the purpose of deadening the noise and reducing the wear of the tires as well as of the pavement.

The hub may be of any suitable construction.

It is understood that the details of construction shown in the drawings are not exclusive, as it is evident that changes may occur to those skilled in the art, within the scope of the appended claim.

Having thus described my invention, what I claim and desire to protect by Letters Patent of the United States of America, is:—

A wheel having a rim, radially movable spring projected spoke members projecting therefrom, segmental tire sections on the outer ends of the spoke members, arranged in closely spaced relation and provided with longitudinal grooves in their outer sides, and flexible cables connecting said tire sections together and arranged in said grooves, the depth of said grooves being such as to protect the cables and cause the outer peripheral surfaces of the tire sections to bear directly on the road surface.

Signed at Buenos Aires, Argentine Republic, this 31st day of May, A. D. 1919.

PERICLES MARCHETTI.

Witnesses:
R. W. HUNTINGTON,
P. ERNEST MARTIN.